INVENTOR.
JACK H. WHITE

ATTORNEYS

INVENTOR.
JACK H. WHITE

United States Patent Office 3,512,373
Patented May 19, 1970

3,512,373
REFRIGERATION SYSTEM WITH ELECTRIC
AUXILIARY PRIME MOVER
Jack H. White, Huntington Beach, Calif., assignor to Transicold Corporation, Montebello, Calif., a corporation of Delaware
Filed July 12, 1968, Ser. No. 744,390
Int. Cl. F25b 27/00
U.S. Cl. 62—228                     3 Claims

ABSTRACT OF THE DISCLOSURE

A refrigeration system of a type having refrigeration units including a compressor and a prime mover for driving the compressor. A centrifugal clutch drivably couples and decouples the prime mover to the compressor. An electric motor serves as an auxiliary prime mover when taking power from a loading dock or otherwise. The condition of the prime mover engine serves to open and close the operating circuit for the electric motor at stages of engine operation related to the engaging and disengaging speed of the centrifugal clutch so as to protect the motor from being prematurely energized in a manner causing the motor to drive the engine. The electric circuit controlling the auxiliary electric motor further serves to disable the starting circuit for the vehicle engine whenever the electric motor has been coupled to a stationary electric power supply.

BACKGROUND OF THE INVENTION

This invention relates to an improved drive unit for transport refrigeration systems of a type wherein a prime mover, such as a diesel engine, is operably coupled to drive a compressor for operation in conjunction with other refrigeration units of a refrigeration system.

In systems of a type, for example, as shown and described in U.S. Letters Patent 3,415,072, assigned to the assignee herein, a prime mover, in the form of a diesel engine, is arranged to drive a compressor unit of a refrigeration system through a mechanical coupling interposed between the prime mover and the compressor.

In some systems of the above general type, it may be desirable to employ an auxiliary prime mover formed, for example, of an electric motor, arranged to operate the compressor during times when the transport refrigeration vehicle is alongside a loading dock or other suitable location equipped with electrical power for operation of the electric motor.

SUMMARY OF THE INVENTION AND OBJECTS

According to the present invention, the condition of the prime mover of the refrigeration system serves to open and close an operating circuit for an auxiliary prime mover in the form of an electric motor at stages of the engine's operation which are related to the engaging and disengaging speeds of a centrifugal clutch interposed between the compressor and the prime mover.

In this manner, the electric motor, even though plugged into a stationary power supply, will not commence operation for driving the compressor until the prime mover has reached that condition of operation wherein the compressor shall have been decoupled from the prime mover. In this manner, the electric motor will be protected against the unnecessary requirement that the motor also drive the prime mover by virtue of failure of the centrifugal clutch to have been conditioned to a decoupled state.

In addition to the above, means have been provided whereby the driver of the vehicle will be unable to drive the vehicle away from the stationary power supply so long as the electric motor remains plugged into the stationary power supply at dockside.

Thus, the electric motor while driving the compressor will now be protected against its being coupled to drive the diesel engine prime mover in conjunction with the compressor. Further, the driver of the vehicle will not be able to inadvertently drive the vehicle while electrical leads remain connected to a dockside power outlet.

It is a general object of the present invention to provide an improved drive unit for a refrigeration system.

It is another object of the invention to provide a drive unit for a refrigeration system wherein the state of operation of the prime mover of the system serves to connect and disconnect an auxiliary electric motor for operation of a compressor of the refrigeration system.

These and other objects of the invention will become readily apparent from the following detailed description of a preferred embodiment.

DESCRIPTION OF THE PREFERRED EMBODIMENT

In general, as will be described in greater detail below, there is provided herein for a refrigeration system of a type having refrigeration units including a compressor and a prime mover for driving the compressor, the combination of a clutch located between the prime mover and the compressor for drivably coupling and decoupling one to the other. An electric motor for driving the compressor as an auxiliary prime mover is incorporated in the system. An electric circuit, coupled to operate the motor, includes switch means operated in response to first and second states of operation of the main prime mover and serves to enable and disable the electric circuit controlling the electric motor as to permit the motor to operate only during that one of the two operating stages of the main prime mover corresponding to a decoupled condition between the main prime mover and the compressor.

Figure 1:
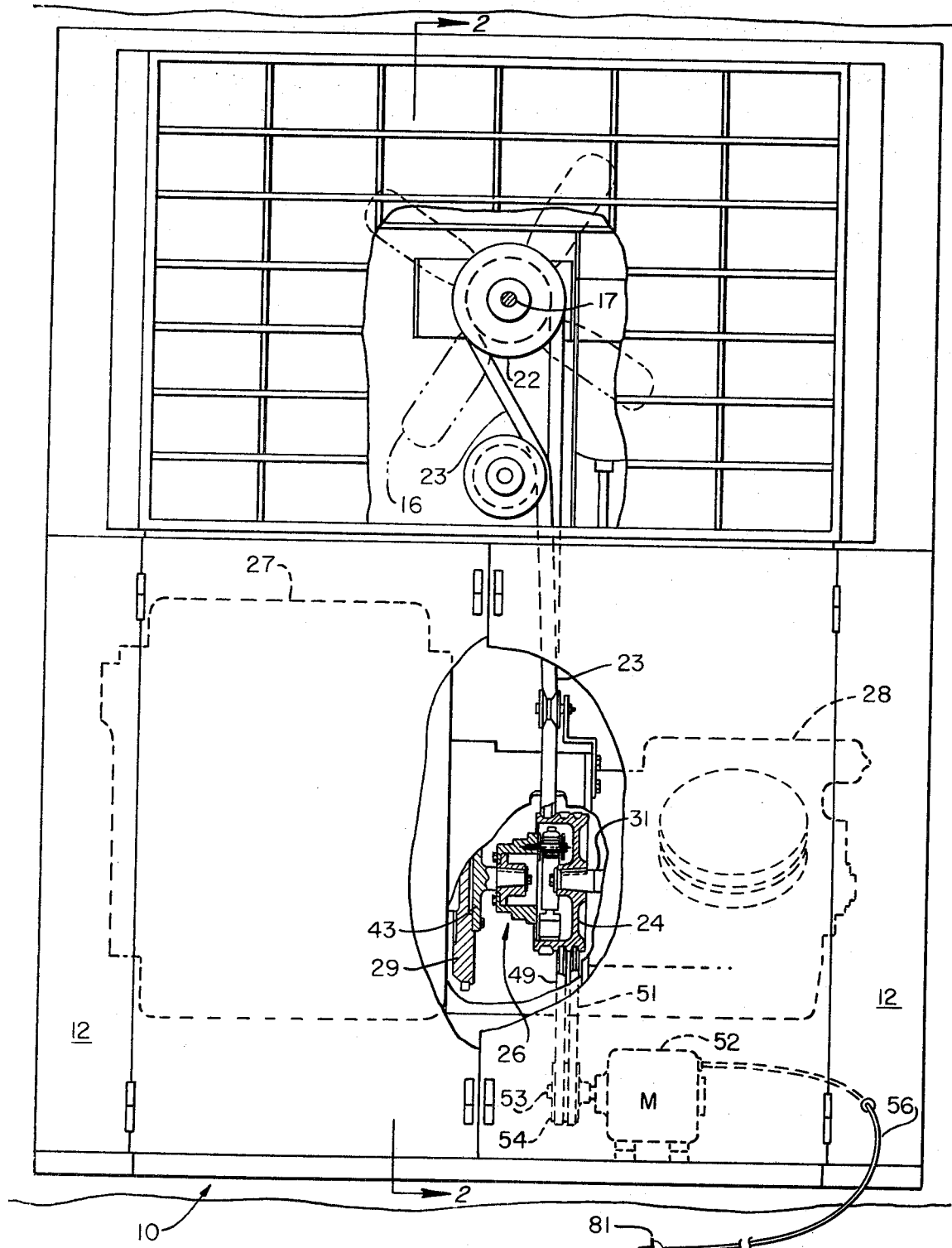
FIG. 1 is a front elevation view, partially broken away, showing a refrigeration system according to the invention.
Figure 2:
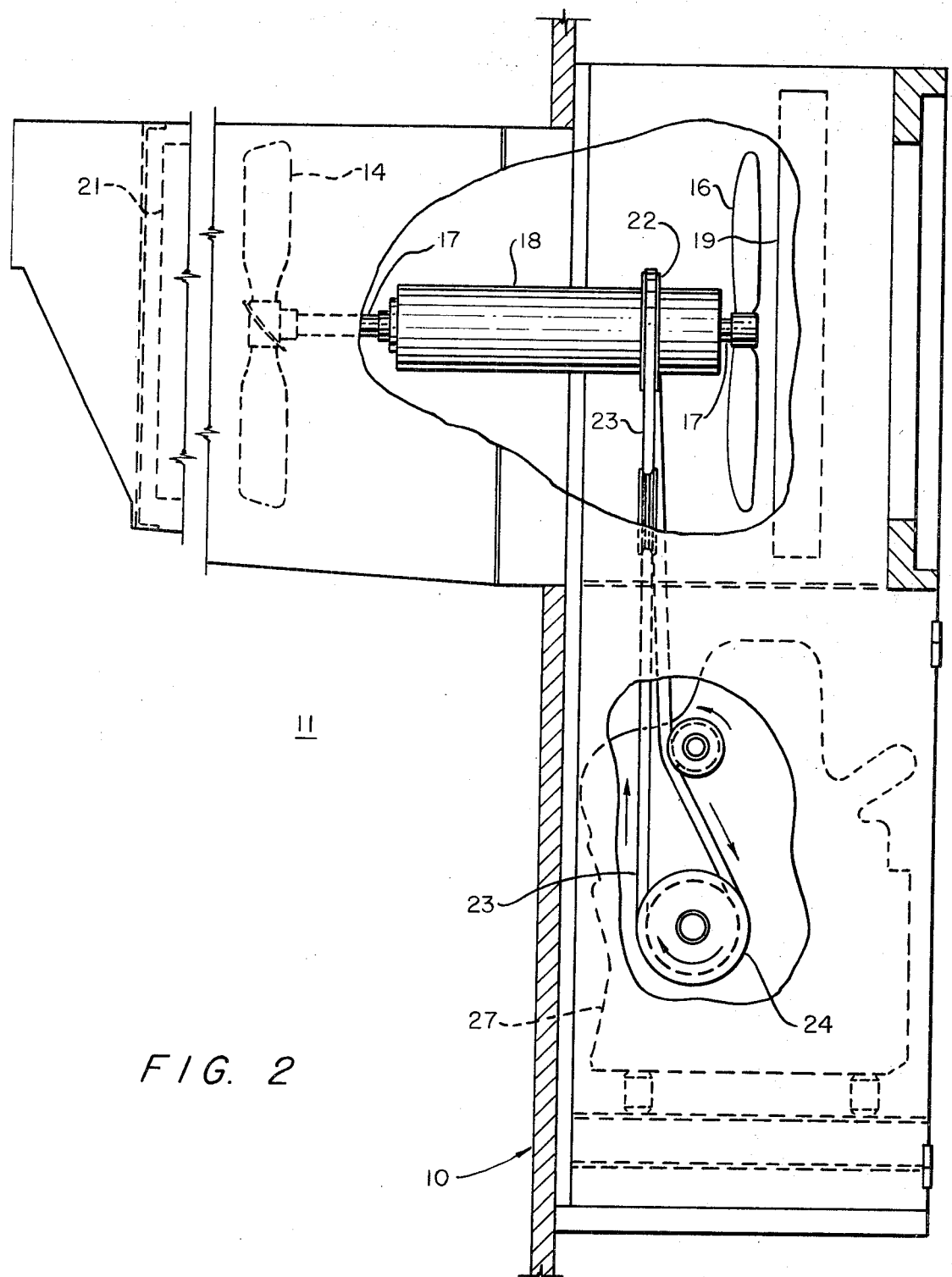
FIG. 2 is a side elevation view, partially in section and partially broken away, of the system shown in FIG. 1.

Referring particularly to FIGS. 1 and 2, reference numeral 10 refers to the forward wall of a van or other vehicle of the type containing a commodity space adapted to be refrigerated. For example, a commodity space 11 may be cooled by the system shown herein.

In general, the refrigeration system as shown in FIGS. 1 and 2 is of a type adapted to be generally contained within covers 12 and mounted on the forward wall 10 of the commodity space 11.

A pair of fans 14, 16, mounted upon a common shaft 17 supported for rotation in a journal box 18, are each respectively associated with refrigeration units 19, 21, for example, as described in the above identified patent application.

A drive pulley 22, keyed to rotate shaft 17, is driven by a cyclically trained drive belt 23 driven by rotation of a power take-off sheave 24 which forms a portion of the centrifugal clutch assembly 26 interposed between a prime mover 27, in the form of a diesel engine, and a compressor unit 28 of the refrigeration system.

Figure 4:
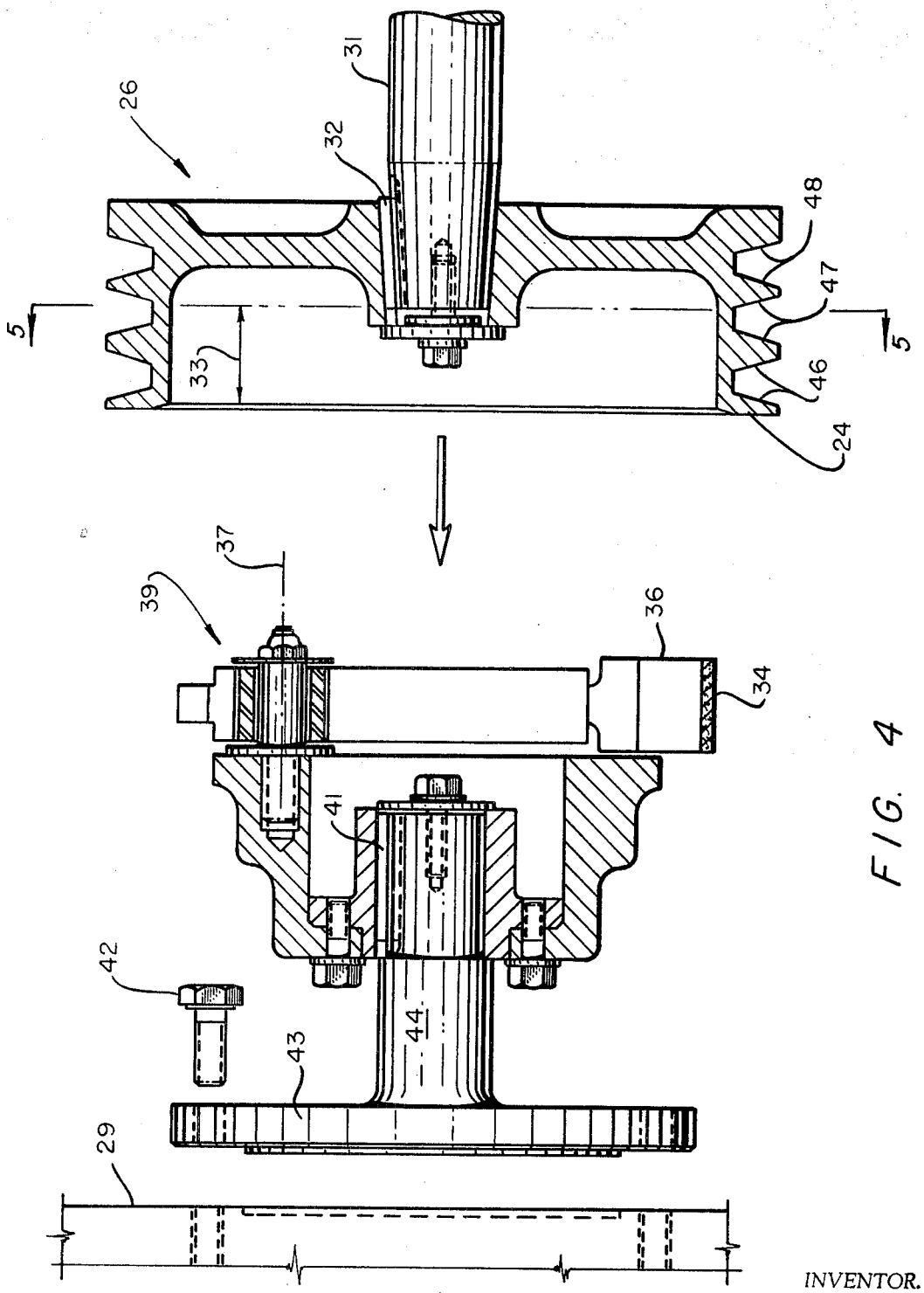
FIG. 4 is an exploded elevation section view showing a centrifugal clutch assembly.
Figure 5:
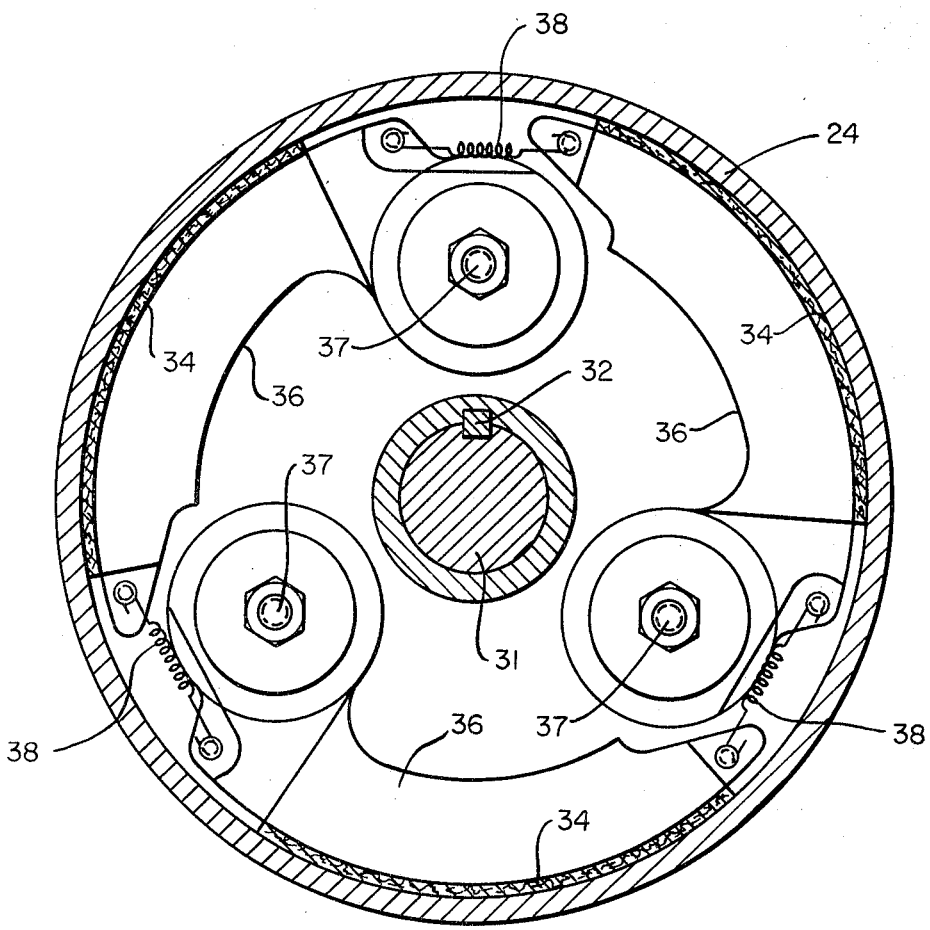
FIG. 5 is an end view taken along the line 5—5 of FIG. 4.

Referring to the exploded view in FIG. 4, clutch assembly 26 serves to drivably couple the output shaft, represented by the prime mover flywheel 29 to the input shaft 31 of compressor 28. Shaft 31 carries the power take-off sheave 24 keyed thereto. Sheave 24 further includes a hollowed interior including a generally cylindrical coupling race 33 adapted to cooperate with friction surfaces 34 forming partial cylindrical coupling surfaces carried upon pivotally mounted shoes 36 pivoted about their respective axes of rotation 37 against the holding action of springs 38 whenever rotation of the shoe assembly 39 rotates at a velocity above a predetermined minimum.

Assembly 39 is rotated by the rotation of flywheel 29 from prime mover 27 via a positive drive connection formed by the key 41. Bolts 42 serve to clamp the drive plate 43 snugly to flywheel 29.

As thus arranged, rotation of flywheel 29 serves to rotate drive plate 43 and its associated integral adaptor shaft 44. The shoe assembly 39, carried upon shaft 44, accordingly is rotated and, upon achieving a predetermined minimum speed of rotation, the friction surfaces 34 of the shoes 36 will be rotated outwardly into engagement with race 33 whereby sheave 24 will also be rotated at substantially the same speed. Thus, at one stage of operation of prime mover 27, shoes 36 will be rotated outwardly to drive compressor shaft 31. At another stage of operation, i.e., at very low speeds or when turned off, prime mover 27 will have been decoupled from shaft 31. Accordingly, upon initiation of operation of prime mover 27, coupling of shaft 31 will occur as prime mover 27 gets up to an appropriate speed.

A groove 46 formed about sheave 24 is adapted to receive drive belt 23 for operation of fans 14, 16 in association with their respective refrigeration units. In addition, sheave 24 includes additional grooves 47, 48 adapted to carry cyclic belts 49, 51 coupled to an auxiliary prime mover in the form of the electric motor 52, the output shaft 53 of which supports a dual pulley 54.

Motor 52 includes a power lead 56 whereby whenever it is convenient, as where the vehicle is alongside a stationary power supply, power lead 56 may be plugged into the stationary electrical power supply and compressor 28 driven by operation of motor 52 in lieu of operating the prime mover 27.

In making the transition from the operation of compressor 28 by means of prime mover 27 to operation of compressor 28 by means of electric motor 52, it is readily apparent that prime mover 27 should be disengaged or decoupled from compressor 28 or motor 52 will also be called upon to drive both the prime mover 27 and compressor 28. In order to avoid the foregoing undesirable circumstance, there has been provided a control system as now to be described with particular reference, for example, to FIG. 3.

Figure 3:
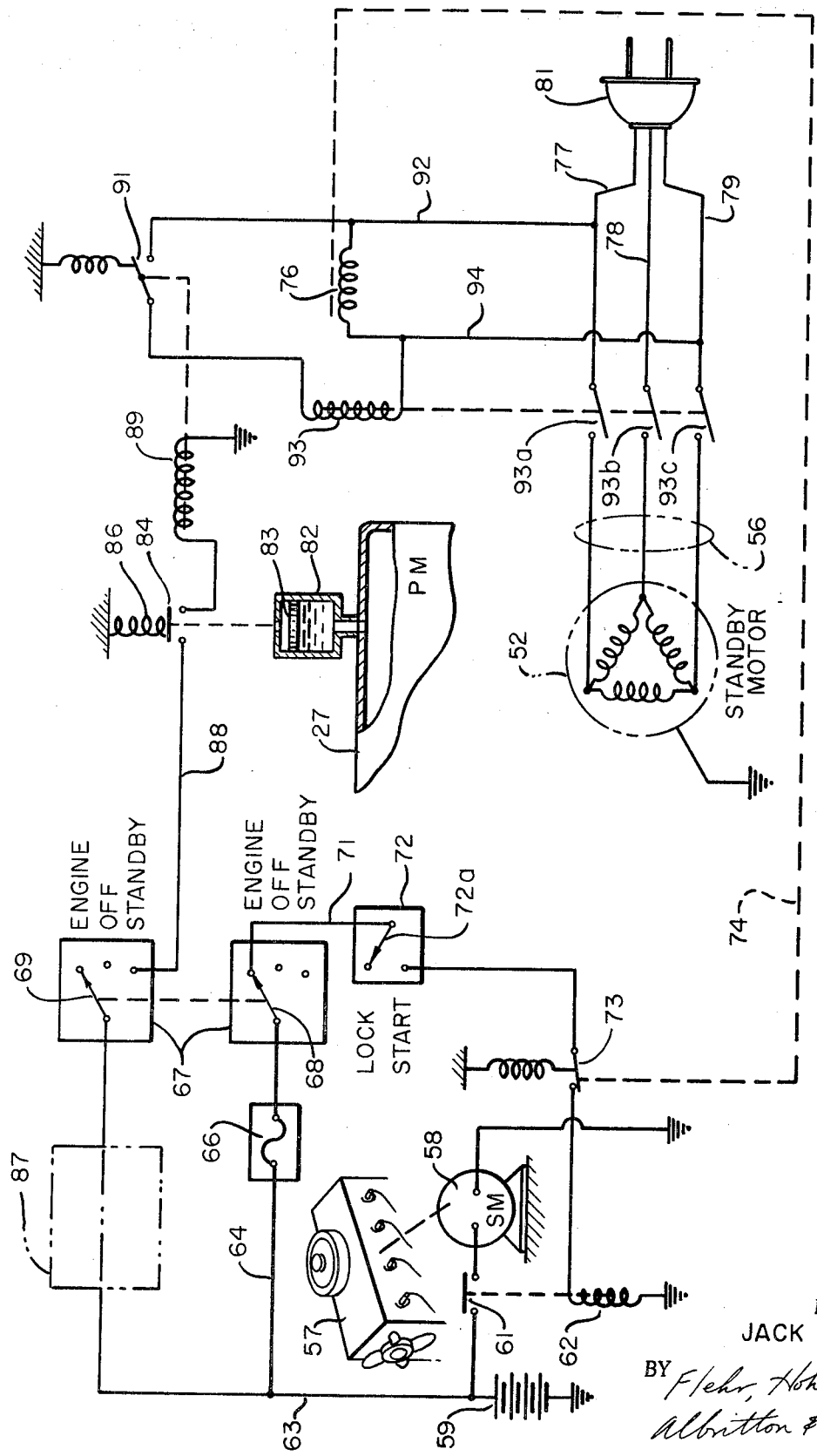
FIG. 3 is a schematic diagram showing the control system according to the invention.

The general lay-out of the arrangement shown in FIG. 3 shows schematically the vehicle engine 57 and a starter motor 58 coupled thereto for starting engine 57.

The starter circuit for vehicle engine 57 includes the battery 59, a normally open contact 61 which is operated by the starter solenoid 62, when energized. Solenoid 62 is energized by a circuit traced from battery 59 along lead 63, a lead 64, fuse 66, and a selector switch 67 having a pair of ganged switch blades 68, 69. By setting blade 68 at the position shown, the starter circuit may be further traced along lead 71 to a starter switch 72 of a type, for example, as may normally be operated by the ignition key of a vehicle whereby upon positioning the contact 72a of starter switch 72 to the start position, the circuit via solenoid 62 will be completed through a normally closed contact point 73.

Means are provided whereby the foregoing starting circuit will be disabled in response to coupling of the power lead 56 of motor 52 to a power supply so as to prevent the inadvertent simultaneous operation of both electric motor 52 and the vehicle engine 57. In this manner, it will be impossible to drive the vehicle away from the dockside so long as electric motor 52 remains plugged into the stationary power supply.

Thus, the normally closed contact point 73 is coupled via the connection represented by dotted line 74 to be operated by a coil 76 disposed across a pair of the three leads 77, 78, 79 which comprise power lead 56. Accordingly, as plug 81 is coupled to a power supply, it will be readily apparent that coil 76 will be energized and thereby open contact point 73 whereby starting circuit for engine 57 will be disabled.

Finally, in a system as above described, there is further provided a control which is operably responsive to two different stages of operation of the prime mover 27 for permitting the electric motor 52 to be coupled or for preventing motor 52 from being coupled to drive compressor 28.

Thus, motor 52 is represented in FIG. 3 by the phantom lines encircling the delta windings indicative of motor 52. Protective grounding is applied to the housing of motor 52 as well as to plug 81. In order to operate motor 52, it is necessary that prime mover 27 be in a decoupled state or condition with respect to compressor 28, i.e., clutch assembly 26 must have been previously decoupled from compressor 28. In order to detect the decoupled state of operation of clutch assembly 26, as schematically represented in FIG. 3, a suitable engine sensing device 82, schematically represented by the fluid operated piston 83 mechanically coupled to armature 84, serves to open the contact points controlled by armature 84 whenever prime mover 27 is in a state of operation capable of driving its output shaft or flywheel 29 at a rate sufficient to cause coupling between shoes 36 and race 33 of the clutch assembly 26. Whenever prime mover 27 has, however, been conditioned to a state of operation whereby decoupling between sheave 24 and shoes 36 can be assured, the pressure responsive piston 83 of device 82 serves to permit spring 86 to drive armature 74 to a position serving to interconnect the contact points controlled thereby.

Accordingly, as the driver of a refrigeration vehicle comes alongside a loading platform and wishes to commence operation of compressor 28 by means of electric motor 52, he may first attach plug 81 to a stationary power supply and then operate the selector switch 67 to a stand-by operation position. At that time, battery 59 will supply power along lead 63 and to switch blade 69 via suitable circuitry of the vehicle indicated by the phantom lines 87 whereby lead 88 will carry the power via armature 84 to energize the stand-by motor relay coil 89. Operation of coil 89 serves to close its associated contact point 91 of another circuit independently operated by the stationary power supply into which plug 81 has been connected. Thus, upon closure of contact point 91, a circuit will be formed from plug 81 via lead 77, lead 92, coil 93 and lead 94 which returns to plug 81 via lead 79. Accordingly, operation of coil 93 serves to close the three associated contact points 93a, 93b and 93c whereby motor 52 will be operated.

From the foregoing, it will be readily evident that the D.C. circuit associated with the vehicle can be readily utilized to operate the A-C motor circuit when motor 52 is taking power from a stationary A-C power supply.

Briefly, from the foregoing, it will be further evident that motor 52 is fully protected against both the possibility of being accidentally coupled to drive prime mover 27 due to premature attachment of power lead 56 to the stationary power supply and also is protected against the possibility that the driver of the vehicle may forget to disengage the power lead 56 before driving the vehicle away from the loading dock.

What is claimed is:

1. In a refrigeration system having refrigeration units including a compressor and prime mover for operating said compressor, a centrifugal clutch between said prime mover and compressor for coupling and decoupling one with respect to the other in response respectively to first and second conditions of operation of said prime mover, an electric motor, having a power lead adapted to be coupled to take power from a power supply, for driving said compressor during periods when said clutch has decoupled the compressor from the prime mover, and switch means operated by said prime mover to respectively decouple and couple said motor to an electrical power source in response to said first and second conditions, an engine for operating a vehicle, a starting circuit for operating the engine, and means for disabling said starting circuit in response to coupling said lead to said power supply to prevent inadvertent simultaneous operation of both said motor and engine.

2. In a refrigeration system of a type adapted to be mounted to a vehicle for cooling a commodity space thereof, apparatus comprising a compressor having an input drive shaft, a prime mover for driving the compressor and having an output shaft adapted to be coupled to drive the input shaft, centrifugal clutch means serving to intercouple said input and output shafts in response to operation of said output shaft above a predetermined minimum speed, a fan adapted to be associated with a refrigeration unit for providing an air stream thereto, a belt drive power take-off coupled to drive said fan and interposed between said compressor and said prime mover and operated in response to coupling of said shafts, auxiliary electric motor means for driving said compressor, and an electric circuit responsive to operation of said prime mover under conditions providing said predetermined minimum speed to electrically disable said motor.

3. In a transport refrigeration system having refrigeration units carried by a vehicle for cooling a commodity space of the vehicle, said system including a compressor, a first prime mover and an auxiliary prime mover for operating said compressor, said auxiliary prime mover having an electrical power lead adapted to be coupled to take power from a stationary power supply, a starting circuit for operating the engine of the vehicle, and means for directly disabling said vehicle starting circuit in response to coupling said lead to said stationary power supply to preclude simultaneous operation of both said auxiliary prime mover and the vehicle to protect said power lead from inadvertent destruction when driving the vehicle away from said stationary power supply.

References Cited

UNITED STATES PATENTS

| | | | |
|---|---|---|---|
| 1,943,317 | 1/1934 | Hulse | 62—236 |
| 2,150,276 | 3/1939 | Gorman | 62—236 |
| 2,895,308 | 7/1959 | Alward | 62—323 XR |
| 2,907,182 | 10/1959 | Kuklinski | 62—236 XR |
| 2,962,873 | 12/1960 | Anderson | 62—236 XR |
| 2,975,614 | 3/1961 | McGuffey | 62—236 XR |

MEYER PERLIN, Primary Examiner

U.S. Cl. X.R.

62—236, 323, 239

Notice of Adverse Decision In Interference

In Interference No. 97,885 involving Patent No. 3,512,373, J. H. White, REFRIGERATION SYSTEM WITH ELECTRIC AUXILIARY PRIME MOVER, final judgment adverse to the patentee was rendered Oct. 12, 1972, as to claim 2.

[*Official Gazette December 12, 1972.*]